(12) United States Patent
Reinhard et al.

(10) Patent No.: US 10,794,473 B2
(45) Date of Patent: Oct. 6, 2020

(54) TRANSMISSION CONTROLLER FOR ELECTRIC VEHICLE AUTOMATIC TRANSMISSION

(71) Applicant: Phoenix Motorcars LLC, Ontario, CA (US)

(72) Inventors: Rick Reinhard, La Crescenta, CA (US); Gustavo Cerochi, North Hills, CA (US); Damon Christopher Pipenberg, Los Angeles, CA (US); Karen Beaty, Long Beach, CA (US)

(73) Assignee: Phoenix Motorcars LLC, Ontario, CA (US)

( * ) Notice: Subject to any disclaimer, the term of this patent is extended or adjusted under 35 U.S.C. 154(b) by 182 days.

(21) Appl. No.: 15/731,572

(22) Filed: Jun. 30, 2017

(65) Prior Publication Data

US 2019/0003583 A1    Jan. 3, 2019

(51) Int. Cl.
| | | |
|---|---|---|
| *F16H 61/00* | (2006.01) | |
| *B60K 31/00* | (2006.01) | |
| *G05B 19/00* | (2006.01) | |
| *G07C 5/00* | (2006.01) | |
| *F16H 61/02* | (2006.01) | |
| *G07C 5/08* | (2006.01) | |
| *G05B 19/19* | (2006.01) | |

(52) U.S. Cl.
CPC ......... *F16H 61/0213* (2013.01); *B60K 31/00* (2013.01); *G05B 19/19* (2013.01); *G07C 5/085* (2013.01); *B60Y 2300/70* (2013.01); *B60Y 2400/70* (2013.01); *F16H 2061/0096* (2013.01); *F16H 2061/0216* (2013.01); *F16H 2061/0223* (2013.01); *G05B 2219/31176* (2013.01)

(58) Field of Classification Search
CPC ......... F16H 61/00; B60K 31/00; G05B 19/00; G05B 19/19; G07C 5/00; G07C 5/0841; G07C 5/085
See application file for complete search history.

(56) References Cited

U.S. PATENT DOCUMENTS

| | | | |
|---|---|---|---|
| 5,305,240 A | * | 4/1994 | Davis ............... F16H 61/32 702/95 |
| 7,486,996 B2 | | 2/2009 | Del'eva |
| 8,256,326 B2 | | 9/2012 | Takamatsu |
| 9,551,132 B2 | | 1/2017 | Lim |

(Continued)

*Primary Examiner* — Yonel Beaulieu
(74) *Attorney, Agent, or Firm* — McKinney Law Group APC; Jeffrey A. McKinney

(57) ABSTRACT

The present invention generally relates to automatic transmission controllers and related methods. In one case, the present invention provides a method of calibrating a controller to match an automatic transmission to an electric motor or internal combustion engine. The controller is not integrated into the transmission. The method comprises adjusting parameters of the controller and includes the steps of: a) Defining the Control Architecture; b) using the Defined Control Architecture to Identify Control Loop Input/Output; c) using the Identified Control Input/Output to Define the Control Algorithm Controller; d) using the Control Algorithm Controller definition to either Define the Shift Schedule or Define the Solenoid Handler, either of which can be used in Optimizing Calibration Via Testing.

9 Claims, 4 Drawing Sheets

(56) References Cited

U.S. PATENT DOCUMENTS

| | | | | |
|---|---|---|---|---|
| 2004/0034460 A1* | 2/2004 | Folkerts | ............... | B60W 30/188 |
| | | | | 701/54 |
| 2006/0219050 A1* | 10/2006 | Morise | ................ | F16H 61/0006 |
| | | | | 74/606 R |
| 2012/0010840 A1* | 1/2012 | Fankhauser | .......... | G01G 23/012 |
| | | | | 702/101 |
| 2012/0130603 A1* | 5/2012 | Simpson | ................ | B62M 9/123 |
| | | | | 701/51 |

\* cited by examiner

TRANSMISSION CONTROLLER FOR ELECTRIC VEHICLE AUTOMATIC TRANSMISSION

FIELD OF THE INVENTION

The present invention generally relates to automatic transmission controllers and related methods.

BACKGROUND OF THE INVENTION

There have been reports regarding transmission control units and methods related to the units. For instance, U.S. Pat. No. 9,551,132, entitled "Automatic Transmission Control Unit for Construction Equipment and Control Method Thereof" is allegedly directed to the following: "The present disclosure relates to an automatic transmission control unit for construction machinery and a control method therefor, and when a load pressure detecting unit detecting a load pressure of hydraulic pressure supplied from a main hydraulic pump to an actuator, such as a cylinder and a hydraulic motor, is in an abnormal state, the automatic transmission control unit receives an electronic control pressure signal having little concerns of a breakdown or a malfunction, and automatically changes a travel speed of construction machinery based on the received electronic control pressure signal." Abstract.

U.S. Pat. No. 8,256,326, entitled "Automatic Transmission Control Unit and Automatic Transmission Including the Same" is allegedly directed to the following: "A control unit that is not subjected to any external force except its own weight until completion of assembly, and is easily mounted to an automatic transmission. A connector facing an inside connector provided inside an automatic transmission is provided at a lower end of a unit main body, and another connecter exposed to the outside of the automatic transmission is provided at an upper end of the unit main body. The unit main body includes a control device such as a microcomputer for controlling the automatic transmission. The unit main body is guided by a moving-side guide portion formed in a lower part thereof and protrusions provided as a fixing-side guide portion, thereby connecting the lower end connecter to the connector. The automatic transmission and the unit main body are sealed by a flange and a packing of a sealing mechanism portion. The flange covers from above a through hole for inserting the unit main body of the automatic transmission therein." Abstract.

U.S. Pat. No. 7,486,996, entitled "Transmission Control Unit Having Pressure Transducer Package" is allegedly directed to the following: "Pressure transducers are incorporated as part of a transmission control unit TCU rather than placed in a remote location. This configuration eliminates the need to link the pressure transducers to the TCU via a long electrical connection, thereby shortening the signal path of the low-level signals output from the pressure transducers and reducing the complexity of the overall system. The transducers may be disposed either directly or on supports having support ports that align with pressure ports in the manifold to form fluidic paths between the manifold and the transducer." Abstract.

Despite the various reports regarding transmission control units and related methods, there is still a need for novel transmission control units and related methods.

SUMMARY OF THE INVENTION

In one case, the present invention provides a method of calibrating a controller to match an automatic transmission to an electric motor or internal combustion engine. The controller is not integrated into the transmission. The method comprises adjusting parameters of the controller and includes the steps of: a) Defining the Control Architecture; b) using the Defined Control Architecture to Identify Control Loop Input/Output; c) using the Identified Control Input/Output to Define the Control Algorithm Controller; d) using the Control Algorithm Controller definition to either Define the Shift Schedule or Define the Solenoid Handler, either of which can be used in Optimizing Calibration Via Testing.

In another case, the present invention provides a method of calibrating a controller to match an automatic transmission such that the transmission can be matched to any electric motor or internal combustion engine. The method comprises the steps of: a) Defining the Control Architecture; b) using the Defined Control Architecture to Identify Control Loop Input/Output; c) using the Identified Control Input/Output to Define the Control Algorithm Controller; d) using the Control Algorithm Controller definition to either Define the Shift Schedule or Define the Solenoid Handler, either of which can be used in Optimizing Calibration Via Testing.

In another case, the present invention provides a method of doing business. The method involves providing an automatic transmission that interfaces with a Ford 6R140 transmission. The method comprises: providing an automatic transmission controller, wherein the controller is easily and quickly modifiable and priced comparably to other transmission controllers that can interface with a Ford 6R140 Transmission, where the automatic transmission controller has one or more of the following: Development Familiarity; Application Flexibility.

DETAILED DESCRIPTION OF THE INVENTION

Figure 1:
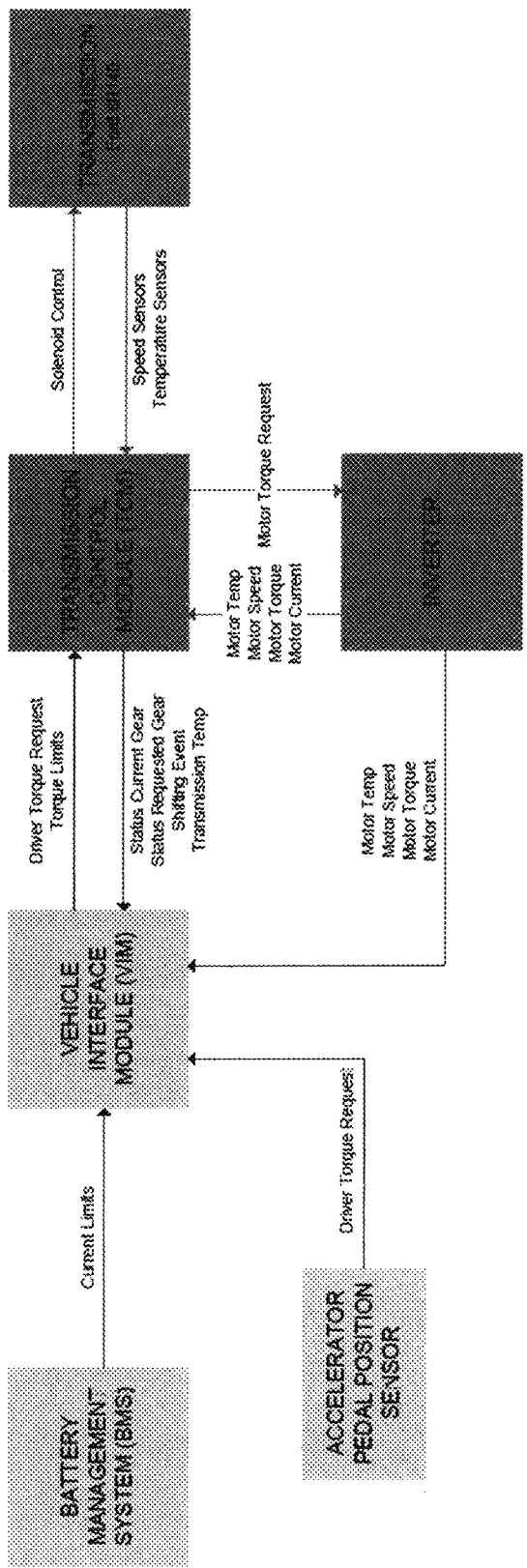
FIG. 1 shows an embodiment of an electronic control unit for a transport vehicle.

"Automatic Transmission" refers to a motor vehicle transmission that can automatically change gear ratios as the vehicle moves.

"Controller Area Network", or CAN bus, is a vehicle bus standard designed to allow microcontrollers and devices to communicate with each other in applications without a host computer. It is a message-based protocol, designed originally for multiplex electrical wiring within automobiles.

Engine Control Unit" refers to a type of electronic control unit that controls a series of actuators on an engine to ensure optimal engine performance. It does this by reading values from a multitude of sensors within the engine bay, interpreting the data using multidimensional performance maps and adjusting the engine actuators accordingly.

"Ford 6R140 Transmission" refers to a six-speed, heavy duty automatic transmission designed to handle higher torques and power than its predecessor, the 5R110W. The 6R140 includes a number of state-of-the-art gear train systems resulting in a more robust and improved product. The Ford Motor Company has developed an integrated TCM electronics unit including control algorithm and calibration for optimum use of the transmission with a variety of engines. The Ford 6R140 transmission is a 6-speed automatic double overdrive transmission that has the following torqshift ratios: $1^{st}$ (3.974:1); $2^{nd}$ (2.318:1); $3^{rd}$ (1.516:1); $4^{th}$ (1.149:1); $5^{th}$ (0.858:1); $6^{th}$ (0.674:1); R (3.12:1).

"Inverter" refers to an electronic device or circuitry that changes direct current ("DC") to alternating current ("AC").

"MATLAB" refers to a multi-paradigm, numerical computing environment and fourth-generation programming language. MATLAB allows matrix manipulations, plotting of functions and data, implantation of algorithms, creation of user interfaces, and interfacing with programs written in other languages.

"Simulink" refers to a graphical programming environment for modeling, simulating and analyzing multidomain dynamic systems. Its primary interface is a graphical block diagramming tool and a customizable block of libraries. It offers tight integration with the rest of the MATLAB environment and can either drive MATLAB or be scripted from it.

"Transmission Control Module", or "TCM", refers to an electronic device that controls electromechanical automatic transmissions. The TCM uses sensors and actuators located on the transmission, as well as data generated by the Engine Control Unit ("ECU") to define how and when gears should be changed for optimum performance and shift quality.

"Transmission Line Pressure" refers to the pressure of one or more hydraulic fluids in the hydraulic system of the transmission.

"Shift Scheduler" or "Gear Shift Scheduler" refers to a component of the TCM that implements a gear shift schedule, representing the vehicle speed at which each gear shift occurs.

"Shift Time" refers to the time interval between gear changes in a transmission during which power delivery is interrupted. The Shift Time for an automatic transmission is typically greater than 100 ms.

"Solenoid Handler" refers to a component of the TCM that activates a transmission solenoid, which directs transmission fluid into a valve body to engage the correct gear.

FIG. 1 shows an embodiment of an electronic control unit ("ECU") for a transport vehicle. As shown, the elements of the ECU are: a battery management system ("BMS"); a vehicle Interface Module ("VIM"); a transmission control module ("TCM"); a transmission (listed as a Ford 6R140); an accelerator pedal position sensor; and, an inverter. FIG. 1 depicts the transfer of various types of data/information to, from and between the shown elements. Data/information on current limits is transmitted from the BMS to the VIM; a driver torque request is sent from the accelerator pedal position sensor to the VIM; data/information on motor temperature, speed, torque and current is transferred from the inverter to the VIM; the driver torque request and torque limits are sent from the VIM to the TCM, which in turn provides data/information back to the VIM regarding status of the current gear, status of the requested gear, shifting events and transmission temperature; data/information on motor temperature, speed, torque and current is transmitted from the inverter to the TCM, which provides a motor torque request back to the inverter; the TCM provides solenoid control the transmission, which transfers data/information from speed and temperature sensors back to the TCM.

Figure 2:
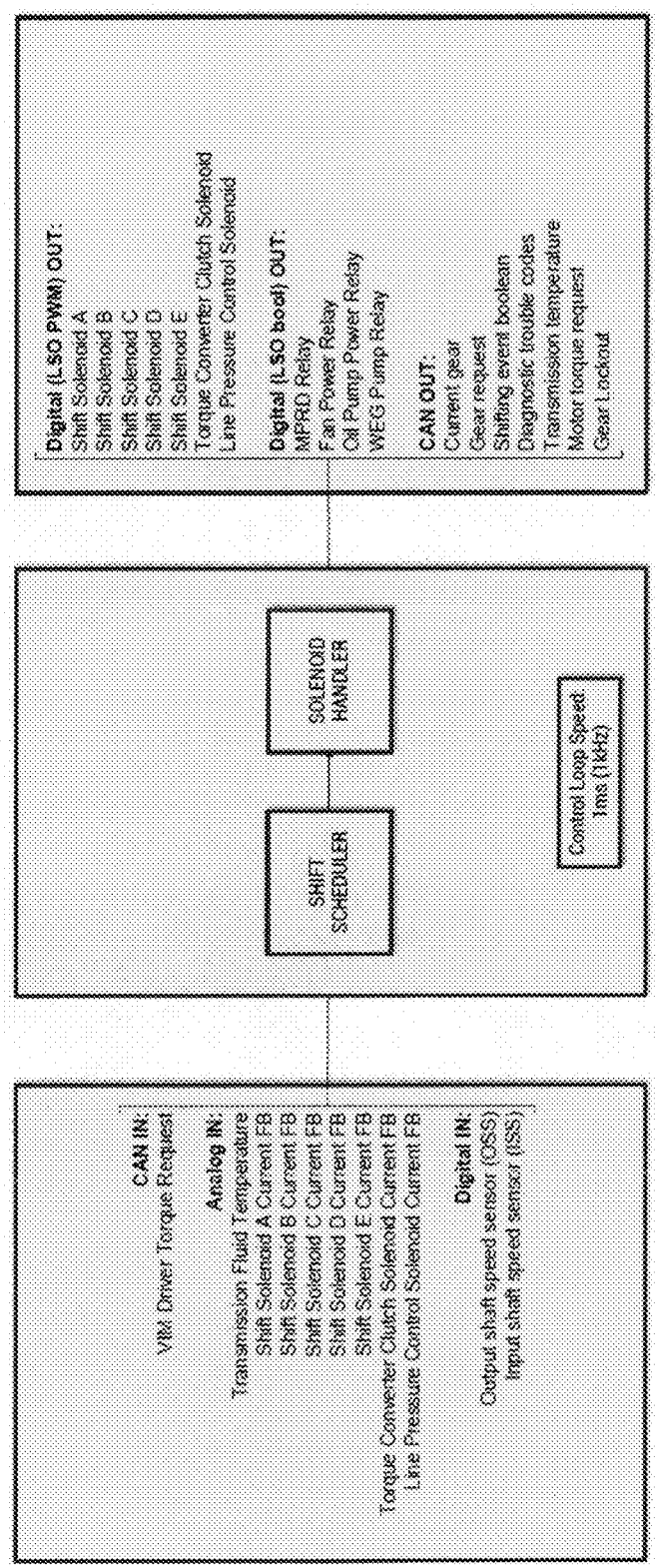
FIG. 2 shows an example of input and output for a TCM, which is depicted as including a shift scheduler and a solenoid handler.
Figure 3:
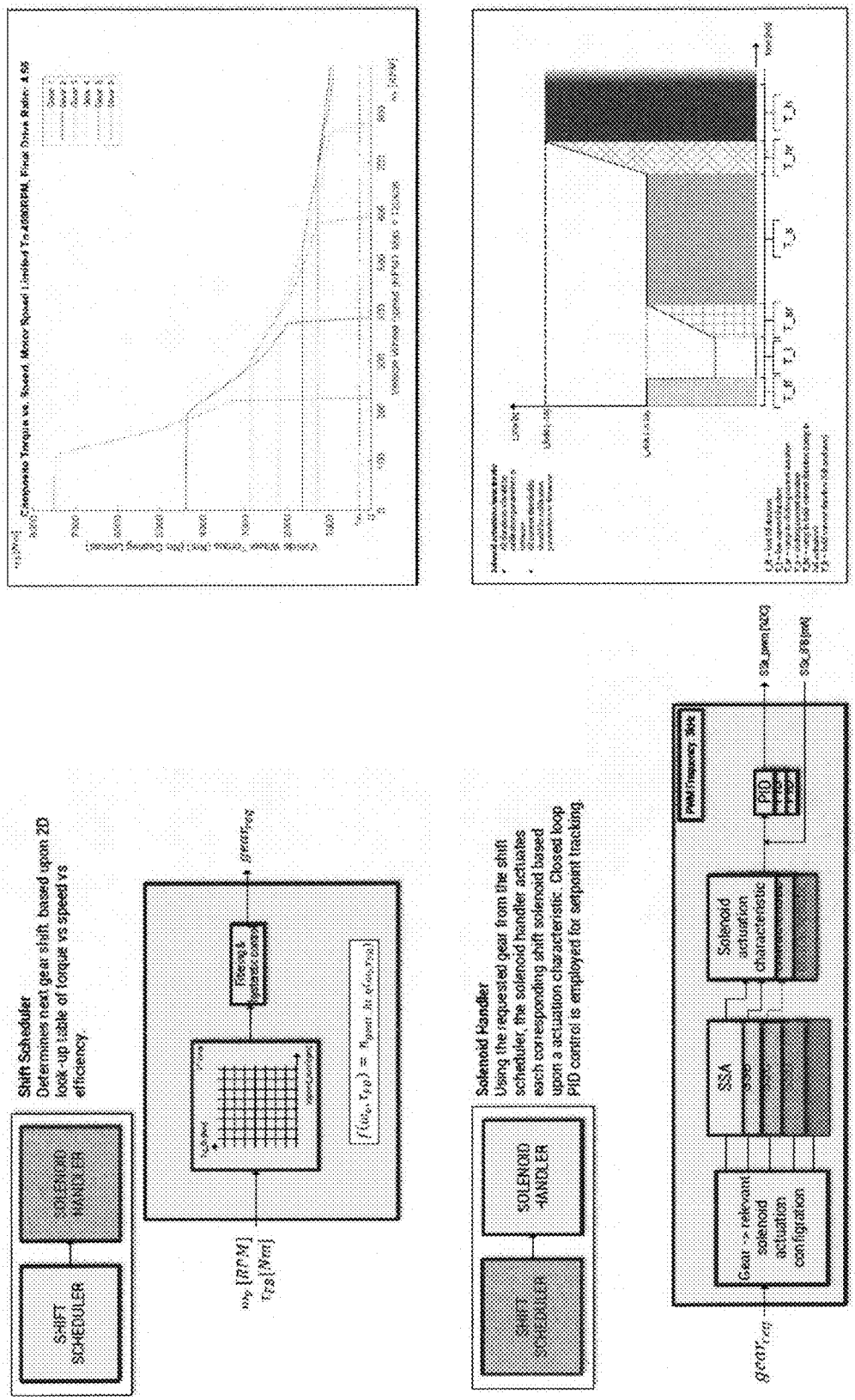
FIG. 3 shows a relationship between the Shift Scheduler and the Solenoid Handler, where the determination of gear shift is based on a table of torque vs speed vs efficiency. It further shows the relationship between actuation characteristics and Solenoid Handler actuation.

FIG. 2 shows an example of input and output for a TCM, which is depicted as including a Shift Scheduler and a Solenoid Handler. The CAN bus provides a VIM Driver Torque Request to the Shift Scheduler of the TCM. Analog data transmitted to the Shift Scheduler include the following: Transmission Fluid Temperature; Shift Solenoid A Current FB; Shift Solenoid B Current FB; Shift Solenoid C Current FB; Shift Solenoid D Current FB; Shift Solenoid E Current FB; Torque Converter Clutch Solenoid Current FB; and Line Pressure Control Solenoid Current FB. Digital data including Output shaft speed sensor ("OSS") and Input shaft speed sensor ("ISS") are also transferred to the shift scheduler. The Shift Scheduler communicates various data/information to the Solenoid Handler.

The Solenoid Handler transmits information out of the TCM to activate a transmission solenoid. Output of Digital (LSO PWM) data/information includes activation of: Shift Solenoid A; Shift Solenoid B; Shift Solenoid C; Shift Solenoid D; Shift Solenoid E; Torque Converter Clutch Solenoid and Line Pressure Control Solenoid. Output of Digital (LSO bool) relay data/information from the Solenoid Handler is MPRD Relay, Fan Power Relay, Oil Pump Power Relay and WEG Pump Relay. The CAN bus transfers data/information such as Current Gear, Gear Request, Shifting Event Boolean, Diagnostic Trouble Codes, Transmission Temperature, Motor Torque Request and Gear Lockout from the Solenoid Handler.

The automatic transmission controller of the present invention can include various components and specifications. Nonlimiting examples of such components and specifications include: at least one CAN transceiver with settable baud rate; 12V nominal operating voltage; 24V tolerant (for large transients); −12V tolerant (reverse polarity protection); a processor ≥10 MHz (for fine-grained processing/feedback control); at least 7 Low Side Drivers for solenoid control that are capable of providing/sinking >2 A, with a variable (0-100%) Duty Cycle, PWM Frequency (3 kHz-10 kHz), current control resolution of at least ±0.1 A if applicable, with at least 5 of the Low Side drivers having current feedback; at least 2 PWM Inputs for shaft speeds, Hall effect inputs with sensing ±200 Hz (12000 RPM); at least 2 Analog Inputs for fluid temperature and transmission range, with an Input range of 0 V-5V and ≥10 bit ADC (common high ADC resolution).

Figure 4:
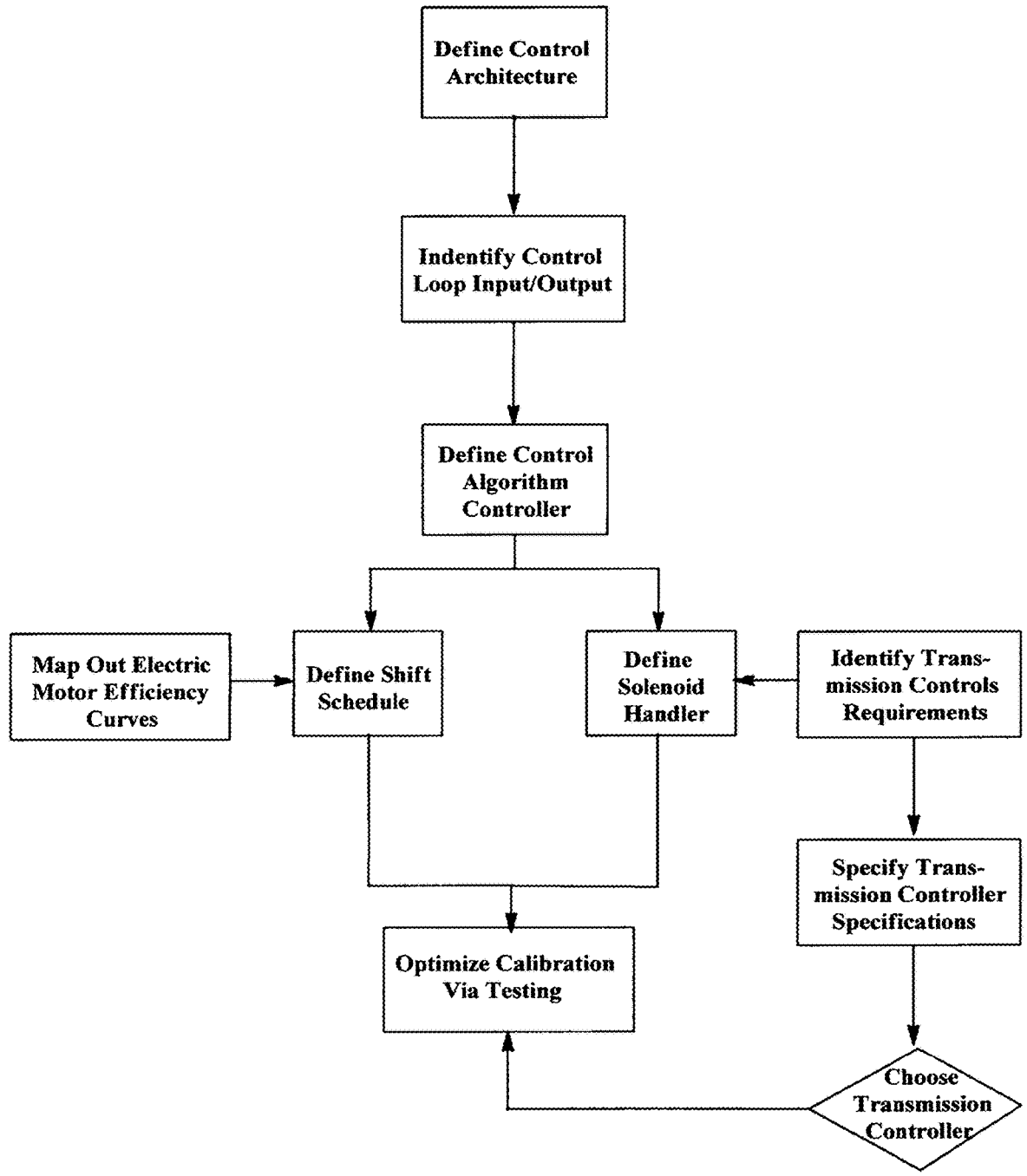
FIG. 4 shows a flow diagram of a method of calibrating a controller to match a transmission to an electric motor.

The present invention provides a method of calibrating a controller to match a transmission (e.g., Ford 6R140 Transmission) to an electric motor or internal combustion engine. The controller is not integrated into the transmission, which facilitates its use with virtually any engine, and includes components and specifications as specified above. FIG. 4 shows a flow diagram of a method of calibrating a controller to match a transmission to an electric motor. Defining the Control Architecture occurs, followed by Identifying Control Loop Input/Output. The Control Algorithm Controller is defined, at which point a decision can be made to either define the Shift Schedule, which receives input from Mapping Out Electric Motor Efficiency Curves, or the Solenoid Handler, which receives input related to Identifying Transmission Controls Requirements. Identifying Transmission Controls Requirements permits definition of Transmission Controller Specifications, which allows Choice of the Transmission Controller. Definition of Shift Schedule, Definition of Solenoid Handler and Choice of Transmission Controller serve as inputs to Optimize Calibration Via Testing. The controller is accordingly matched to a particular transmission.

The present invention also provides a method of calibrating a controller such that a transmission can be matched to any electric motor or internal combustion engine. Typically, the automatic transmission is a six-speed, heavy duty automatic transmission; oftentimes it is the Ford 6R140 Transmission. This method is similarly represented by FIG. 4, with the exception that, where an internal combustion engine is used, the internal combustion efficiency curves are mapped out (instead of mapping out the electric motor efficiency curves).

The present invention also provides a business method. The method comprises providing an automatic transmission controller as described above where the controller is easily and quickly modifiable and priced comparably to other transmission controllers that can interface with a six-speed, heavy duty automatic transmission such as the Ford 6R140 Transmission. For the business method, the automatic transmission controller as described above further has one or more of the following: Development Familiarity (MATLAB/Simulink compilation preferred due to aggressive timeframe); Application Flexibility (post-delivery code modification preferred). In certain cases, the business method comprises the method of calibrating a controller to match a transmission and/or the method of calibrating a controller such that a transmission can be matched to any electric motor or internal combustion engine, both according to the present invention.

The invention claimed is:

1. A method of calibrating a controller to match an automatic transmission to an electric motor or internal combustion engine, wherein the controller is not integrated into the transmission, and wherein the method comprises adjusting parameters of the controller, and wherein the method comprises the steps of: a) defining a control architecture; b) using the defined control architecture to identify control loop input/output; c) using the identified control input/output to define a control algorithm controller; d) using the control algorithm controller definition to define a solenoid handler, thereby activating a transmission solenoid which directs transmission fluid into a valve body engaging the correct gear.

2. The method of claim 1, wherein the shift schedule receives further input in the form of electric motor efficiency curves, and wherein the defined solenoid handler receives further input from identification of transmission controls requirements.

3. The method of claim 2, wherein identification of transmission controls requirements is used to select the transmission controller specifications, and wherein the transmission controller specifications are used to choose the transmission controller.

4. The method of claim 3, wherein the choice of transmission controller provides further input into optimizing calibration via testing.

5. A method of calibrating a controller to match an automatic transmission such that the transmission can be matched to any electric motor or internal combustion engine, wherein the method comprises the steps of: a) defining a control architecture; b) using defined control architecture to identify control loop input/output; c) using the identified control input/output to define an algorithm controller; d) using the control algorithm controller definition to define a solenoid handler, thereby activating a transmission solenoid which directs transmission fluid into a valve body engaging the correct gear.

6. The method of claim 5, wherein the transmission is matched to an electric motor.

7. The method of claim 5, wherein the transmission is matched to an internal combustion engine.

8. The method of claim 6, wherein the shift schedule receives further input in the form of electric motor efficiency curves, and wherein the defined solenoid handler receives further input from identification of transmission control requirements.

9. The method of claim 7, the defined shift schedule receives further input in the form of internal combustion engine efficiency curves, and wherein the defined solenoid handler receives further input from identification of transmission controls requirements.

* * * * *